UNITED STATES PATENT OFFICE.

SAMUEL A. FLOWER, OF NEW YORK, N. Y.

BLEACHING, CLEANSING, AND SIZING COMPOUND.

936,228.                    Specification of Letters Patent.        Patented Oct. 5, 1909.

No Drawing.        Application filed September 22, 1908.   Serial No. 454,265.

*To all whom it may concern:*

Be it known that I, SAMUEL A. FLOWER, a citizen of the United States, and resident of the borough of Manhattan, in the county of New York and State of New York, have invented certain new and useful Improvements in Bleaching, Cleansing, and Sizing Compounds and Processes for Making the Same, of which the following is a specification.

My invention relates to a bleaching, cleansing and sizing compound, and the process for making the same.

Heretofore the chlorid of lime and sulfuric acid used to bleach vegetable fibers have injuriously affected the same, burning the fibers, rendering them harsh, brittle and impairing their efficiency and elasticity. The process heretofore used requires a number of steps such as boiling in soda, treatment in chlorid of lime, sulfuric acid, and a number of washings.

With the present invention vegetable fibers and the like can be bleached very quickly in one bath, cheaply and without any injury to the fibers.

To produce the new compound, I take about six parts of chlorid of lime and mix with about one part of salsoda or carbonate of soda, sufficient water is added to the mixture to form a paste, which is allowed to stand for about twenty-four hours, during which time a hypochlorite of soda and an insoluble carbonate of lime is formed. Then there is added to the product formed, about two parts of potash soap and about one part of acetic acid. The soap and pyroligneous acid prevent the burning of the fibers and the carbonate of lime combines with the soap and produces a size. The pyroligneous acid may be omitted.

To use the compound it is mixed with about six parts of water at about 70 degrees Fahr., and fifty parts of the fiber to be treated.

Having described my invention I claim:

1. The process of making a bleaching, cleansing and sizing compound, by mixing about six parts of chlorid of lime with one part of salsoda, adding water to the mixture to form a paste, allowing the mixture to stand about twenty-four hours, thereby producing a hypochlorite of soda and an insoluble carbonate of lime, and adding two parts of potash soap.

2. The process of making a bleaching, cleansing and sizing compound, by mixing about six parts of chlorid of lime with one part of salsoda, adding water to the mixture to form a paste, allowing the mixture to stand about twenty-four hours, thereby producing a hypochlorite of soda and an insoluble carbonate of lime, and adding two parts of potash soap and one part of acetic acid.

3. A bleaching, cleansing and sizing compound comprising a hypochlorite of soda, carbonate of lime and soap.

4. A bleaching, cleansing and sizing compound comprising a hypochlorite of soda, carbonate of lime, soap and acetic acid.

Signed at the borough of Manhattan in the county of New York and State of New York this 21st day of September A. D. 1908.

SAMUEL A. FLOWER.

Witnesses:
F. L. KINSMAN,
GEO. C. ESKHOLME.